United States Patent
Takaki

(10) Patent No.: US 9,372,262 B2
(45) Date of Patent: Jun. 21, 2016

(54) DEVICE AND METHOD FOR JUDGING LIKELIHOOD OF COLLISION BETWEEN VEHICLE AND TARGET, VEHICLE COLLISION AVOIDANCE SYSTEM, AND METHOD FOR AVOIDING COLLISION BETWEEN VEHICLE AND TARGET

(71) Applicant: DENSO CORPORATION, Kariya, Aichi-pref. (JP)

(72) Inventor: Ryo Takaki, Okazaki (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 285 days.

(21) Appl. No.: 14/080,868

(22) Filed: Nov. 15, 2013

(65) Prior Publication Data
US 2014/0139368 A1 May 22, 2014

(30) Foreign Application Priority Data
Nov. 20, 2012 (JP) ................................. 2012-254589

(51) Int. Cl.
*G01S 13/93* (2006.01)
*G01S 13/72* (2006.01)
(Continued)

(52) U.S. Cl.
CPC .............. *G01S 13/931* (2013.01); *B60W 30/09* (2013.01); *G01S 13/723* (2013.01); *G01S 13/865* (2013.01); *G01S 13/867* (2013.01); *G08G 1/166* (2013.01); *G01S 2013/9353* (2013.01)

(58) Field of Classification Search
CPC ... G01S 13/931; G01S 13/723; G01S 13/867; G01S 13/865; G01S 2013/9353

USPC .......... 342/70–72, 52–55; 340/435, 436, 903; 701/301
See application file for complete search history.

(56) References Cited

U.S. PATENT DOCUMENTS 6,420,996 B1 * 7/2002 Stopczynski ......... G01S 13/765
340/435
6,452,535 B1 * 9/2002 Rao ....................... G01S 13/765
340/436

(Continued)

FOREIGN PATENT DOCUMENTS

JP 2004-362586 12/2004
JP 2006-099155 4/2006

(Continued)

OTHER PUBLICATIONS

Office Action dated Jun. 2, 2015, issued in the corresponding JP application No. 2012-254589 with English translation.

(Continued)

*Primary Examiner* — John B Sotomayor
(74) *Attorney, Agent, or Firm* — Harness, Dickey & Pierce, P.L.C.

(57) ABSTRACT

A device for judging a likelihood of a collision between a vehicle and a target is provided. The device comprises: a target detection sensor and an ECU. The ECU comprises: a CPU; an orientation determining unit configured to enable the CPU to determine the orientation of a target relative to a reference vehicle in which the device for judging a likelihood of a collision is mounted, using information which is detected by the target detection sensor; a change-amount detecting unit configured to enable the CPU to detect an amount of temporal change in the orientation of the target; and a determining unit configured to enable the CPU to determine a likelihood of a collision between the reference vehicle and the target under a condition that the amount of temporal change in the orientation of the target is a predetermined threshold or less.

14 Claims, 11 Drawing Sheets

(51) Int. Cl.
*G01S 13/86* (2006.01)
*B60W 30/09* (2012.01)
*G08G 1/16* (2006.01)

(56) References Cited

U.S. PATENT DOCUMENTS

| | | | | |
|---|---|---|---|---|
| 8,952,799 | B2* | 2/2015 | Irrgang | B60W 30/0956 |
| | | | | 340/435 |
| 9,123,252 | B2* | 9/2015 | Nagata | B60T 7/22 |
| 9,132,352 | B1* | 9/2015 | Rabin | A63F 13/30 |
| 9,159,236 | B2* | 10/2015 | Lord | G08G 1/164 |
| 9,233,659 | B2* | 1/2016 | Rosenbaum | B60W 30/0956 |
| 9,251,708 | B2* | 2/2016 | Rosenbaum | G06K 9/00805 |
| 2004/0246114 | A1 | 12/2004 | Hahn | |
| 2008/0084283 | A1* | 4/2008 | Kalik | B60Q 9/00 |
| | | | | 340/435 |
| 2010/0191391 | A1* | 7/2010 | Zeng | G01S 13/723 |
| | | | | 701/1 |
| 2010/0289662 | A1* | 11/2010 | Dasilva | F16P 3/147 |
| | | | | 340/686.6 |
| 2012/0306664 | A1* | 12/2012 | Geter | G08G 1/166 |
| | | | | 340/903 |
| 2014/0139368 | A1* | 5/2014 | Takaki | G01S 13/723 |
| | | | | 342/70 |
| 2015/0294419 | A1* | 10/2015 | Gonzalez Miranda | G06Q 40/08 |
| | | | | 701/31.6 |

FOREIGN PATENT DOCUMENTS

| | | |
|---|---|---|
| JP | 2006-260217 | 9/2006 |
| JP | 2006-293539 | 10/2006 |
| JP | 2007-087203 | 4/2007 |
| JP | 2008-062666 | 3/2008 |
| JP | 2010-018162 | 1/2010 |
| JP | 2011-086205 | 4/2011 |
| JP | 2011-150578 | 8/2011 |
| JP | 2012-168578 | 9/2012 |

OTHER PUBLICATIONS

Office Action dated Sep. 30, 2014 in corresponding Japanese Application No. 2012-254589.

* cited by examiner

FIG.9

| LIKELIHOOD OF COLLISION | | EASE OF TARGET MOVEMENT-DIRECTION CHANGE | | |
|---|---|---|---|---|
| | | LOW | MEDIUM | HIGH |
| PROBABILITY OF TARGET MOVEMENT-DIRECTION CHANGE | LOW | HIGH | MEDIUM | MEDIUM |
| | MEDIUM | MEDIUM | MEDIUM | LOW |
| | HIGH | MEDIUM | LOW | LOW |

DEVICE AND METHOD FOR JUDGING LIKELIHOOD OF COLLISION BETWEEN VEHICLE AND TARGET, VEHICLE COLLISION AVOIDANCE SYSTEM, AND METHOD FOR AVOIDING COLLISION BETWEEN VEHICLE AND TARGET

CROSS-REFERENCE TO RELATED APPLICATION

This application is based on and claims the benefit of priority from earlier Japanese Patent Application No. 2012-254589 filed Nov. 20, 2012, the description of which is incorporated herein by reference.

BACKGROUND

1. Technical Field

The present invention relates to a device that judges the likelihood of a collision between a vehicle and a target, a vehicle collision avoidance system for avoiding a collision between the vehicle and the target, and a method for avoiding a collision between the vehicle and the target.

2. Related Art

Conventionally, a technology is known in which an image sensor is mounted in a vehicle. A target that is present ahead of the vehicle is detected using the sensor.

The likelihood of the collision between the vehicle and the target is then judged. For example, in a technology described in Japanese laid-open patent JP-A-2006-99155, an amount of time TTC until a target that is present ahead of the vehicle reaches the vehicle is calculated based on an image captured by the image sensor. When the TTC is a threshold or lower, the likelihood of the collision of the vehicle with the target is determined to be high, and then the target becomes subject to monitoring for an evasive action of the collision.

Ordinarily, if a driver driving a vehicle that is the target or a pedestrian that is the target notices the presence of the vehicle with which there is a risk of collision, the driver or the pedestrian takes action to avoid the collision. Therefore, the likelihood of a collision decreases. On the other hand, if the target does not notice the presence of the vehicle with which there is a risk of collision, the target may not take action to avoid the collision. In that case, the likelihood of a collision increases.

As described above, the likelihood of a collision between a target and a vehicle changes depending on the state of the target. However, in the conventional technology, the likelihood of a collision is uniformly determined to be high if a predetermined condition, such as the distance between the target and the vehicle, is met. Therefore, an issue occurs in that the likelihood of a collision is determined to be high, even in a situation in which the likelihood of a collision between the target and the vehicle is actually low.

Hence, a vehicle collision judging device and a vehicle collision avoidance system being capable of appropriately determining the likelihood of a collision depending on the situation are desired.

SUMMARY

A device for judging a likelihood of a collision between a vehicle and a target (the device hereinafter referred to as "vehicle collision judging device") includes: a target detection sensor and an ECU (electronic control unit). The ECU comprises: a CPU; an orientation determining unit configured to enable the CPU to determine the orientation of a target relative to a reference vehicle in which the vehicle collision judging device is mounted, using information which is detected by the target detection sensor; a change-amount detecting unit configured to enable the CPU to detect an amount of temporal change in the orientation of the target; and a determining unit configured to enable the CPU to determine a likelihood of a collision between the reference vehicle and the target under a condition that the amount of temporal change in the orientation of the target is a predetermined threshold or less.

The vehicle collision judging device of the present application determines the likelihood of a collision between the reference vehicle and the target when the amount of temporal change in the orientation of the target is a predetermined threshold or less (in other words, in an instance in which the risk of a collision between the reference vehicle and the target becomes high if the reference vehicle and the target advance as is without taking actions to avoid the collision). Therefore, the vehicle collision judging device of the present application can efficiently determine the likelihood of a collision between the vehicle and the target.

In addition, the ECU further includes an angle calculating unit configured to enable the CPU to calculate an angle formed by a movement direction of the reference vehicle and a movement direction of the target. The vehicle collision judging device determines the likelihood of a collision between the reference vehicle and the target to be higher as the absolute value of the angle becomes smaller. The target has more difficulty noticing the presence of the reference vehicle as the absolute value of the angle becomes smaller. Hence the likelihood of a collision between the reference vehicle and the target becomes high. The vehicle collision judging device of the present application determines the likelihood of a collision between the reference vehicle and the target to be higher as the absolute value of the angle becomes smaller, as described above. Therefore, the vehicle collision judging device of the present application can appropriately determine the likelihood of a collision depending on the state of the target.

BRIEF DESCRIPTION OF THE DRAWINGS

In the accompanying drawings:

FIG. 9 shows a map used to determine the likelihood of a collision;

DESCRIPTION OF EMBODIMENTS

An embodiment of the present invention will hereinafter be described with reference to FIG. 1 to FIG. 12.

1. Configuration of an On-Board System

Figure 1:
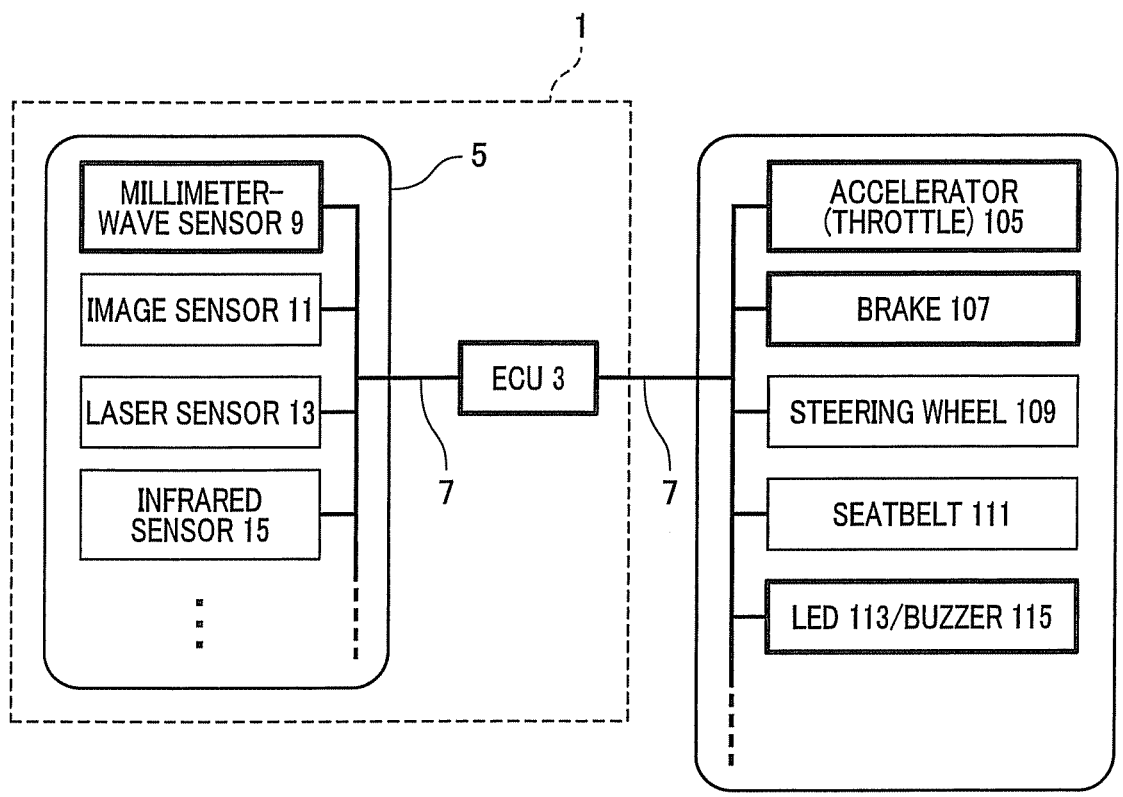
FIG. 1 shows a block diagram of an on-board system.

First, a configuration of an on-board system will be described with reference to FIG. 1 to FIG. 3. As shown in FIG. 1, an on-board system 1 that is mounted in a reference vehicle 101 includes an electronic control unit (ECU) 3 and a sensor section 5. The ECU 3 and the sensor section 5 are connected to each other by an in-vehicle network 7.

Figure 2:
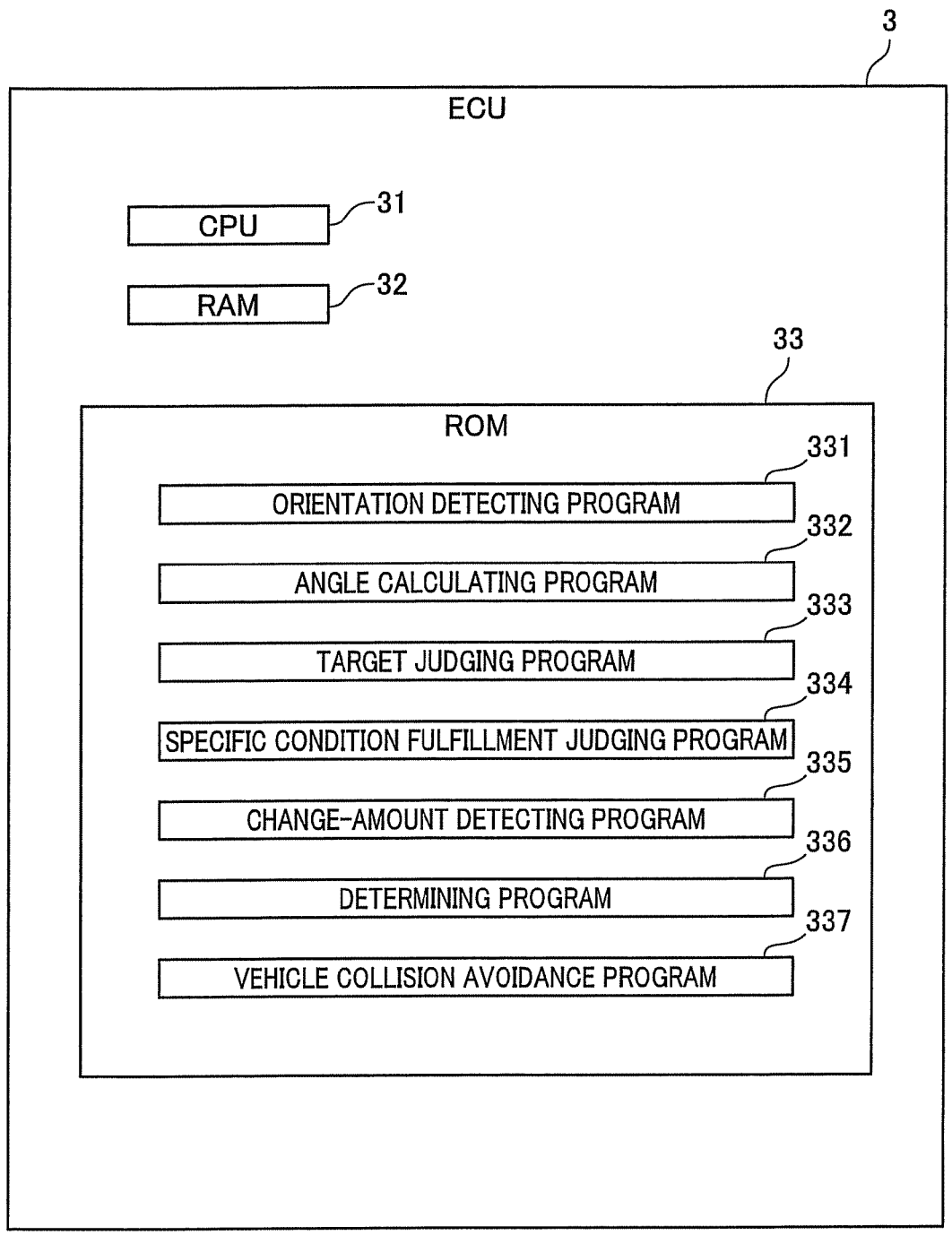
FIG. 2 shows programs stored in a ROM.

As shown in FIG. 2, the ECU 3 is configured by known elements, such as a central processing unit (CPU 31), a random access memory (RAM 32), and a read-only memory (ROM 33). The ECU 3 performs processing operations as routine works described hereafter. The ROM 33 stores therein various programs as routine programs, as shown in FIG. 2, that run by the CPU 31.

The sensor section 5 includes a millimeter-wave sensor 9 as a target detection sensor, an image sensor 11, a laser sensor 13, and an infrared sensor 15. As shown in FIG. 3, the millimeter-wave sensor 9 is attached to a front portion of the reference vehicle 101. The millimeter-wave sensor 9 is configured as a so-called "millimeter-wave radar" to which a frequency modulated continuous wave (FMCW) system is adopted. The millimeter-wave sensor 9 transmits millimeter-wave band radar waves that have been frequency-modulated, to the target. The millimeter-wave sensor 9 is used for detecting the presence, relative orientation, and distance of a target which has reflected the millimeter waves to a direction of the millimeter-wave sensor 9.

The range over which the millimeter-wave sensor 9 transmits the millimeter waves is a range that can include a target (such as another vehicle, a pedestrian, a motorcycle, or a bicycle) presents around (e.g. in front of, to the side of, and diagonally behind) the reference vehicle 101.

Figure 3:
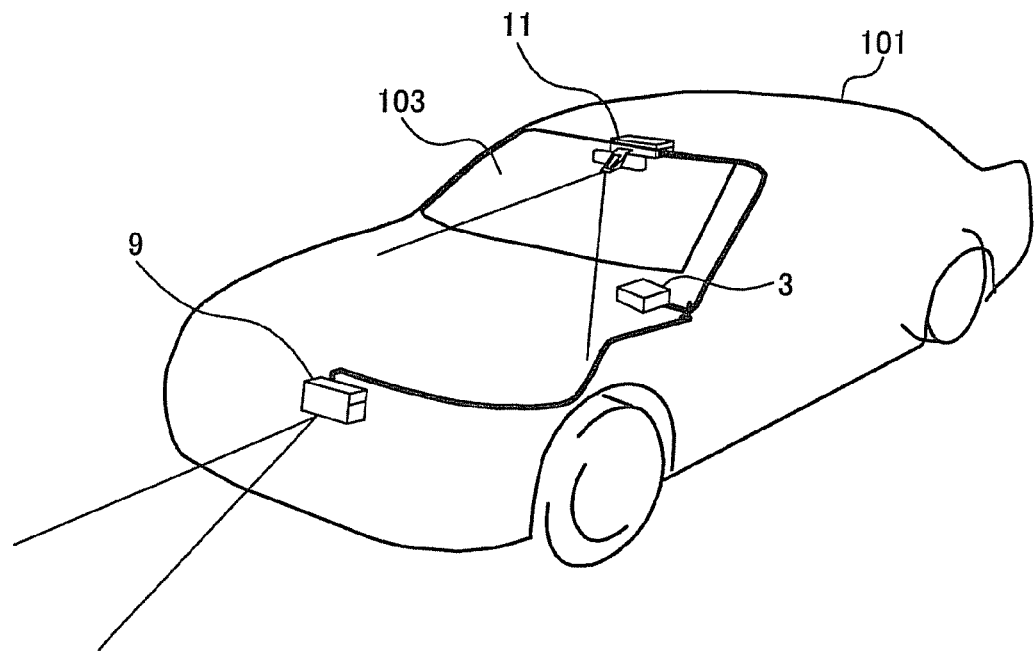
FIG. 3 shows a layout diagram of an ECU, a millimeter-wave sensor, and an image sensor in a reference vehicle.

As shown in FIG. 3, the image sensor 11 is attached near the top edge of a front windshield 103. The image sensor 11 is a camera having a known configuration. The image sensor 11 captures the scene around the reference vehicle 101.

The laser sensor 13 and the infrared sensor 15 are sensors which are respectively provided with well-known components. Similar to the millimeter-wave sensor 9, the laser sensor 13 and the infrared sensor 15 can detect a target that is present around the reference vehicle 101 as a target detection sensor. The laser sensor 13 and the infrared sensor 15 serve as substitute means for the millimeter-wave sensor 9. However, the laser sensor 13 and the infrared sensor 15 may be used together with the millimeter-wave sensor 9.

The reference vehicle 101 also includes an accelerator (throttle) 105, a brake 107, a steering wheel 109, a seat belt 111, a light-emitting diode (LED) lamp 13, and a buzzer 115. The ECU 3 is electrically connected to the accelerator (throttle) 105, the brake 107, the steering wheel 109, the seat belt 111, the light-emitting diode (LED) lamp 13, and the buzzer 115 by the in-vehicle network 7, and controls these components.

An orientation detecting program 331, an angle calculating program 332, a target judging program 333, a specific condition fulfillment judging program 334, a change-amount detecting program 335, a determining program 336, and a vehicle collision avoidance program 337 respectively configures an orientation detecting unit, an angle calculating unit, a target judging unit, a specific condition fulfillment judging unit, a change-amount detecting unit, a determining unit, and a vehicle collision avoidance unit. Those units can perform a particular purpose in cooperation with the CPU 31.

In addition, the reference vehicle 101 includes a known configuration such as a navigation system, a speed sensor, and a yaw rate sensor, in addition to the on-board system 1.

2. Process Performed by the On-Board System 1

Figure 4:
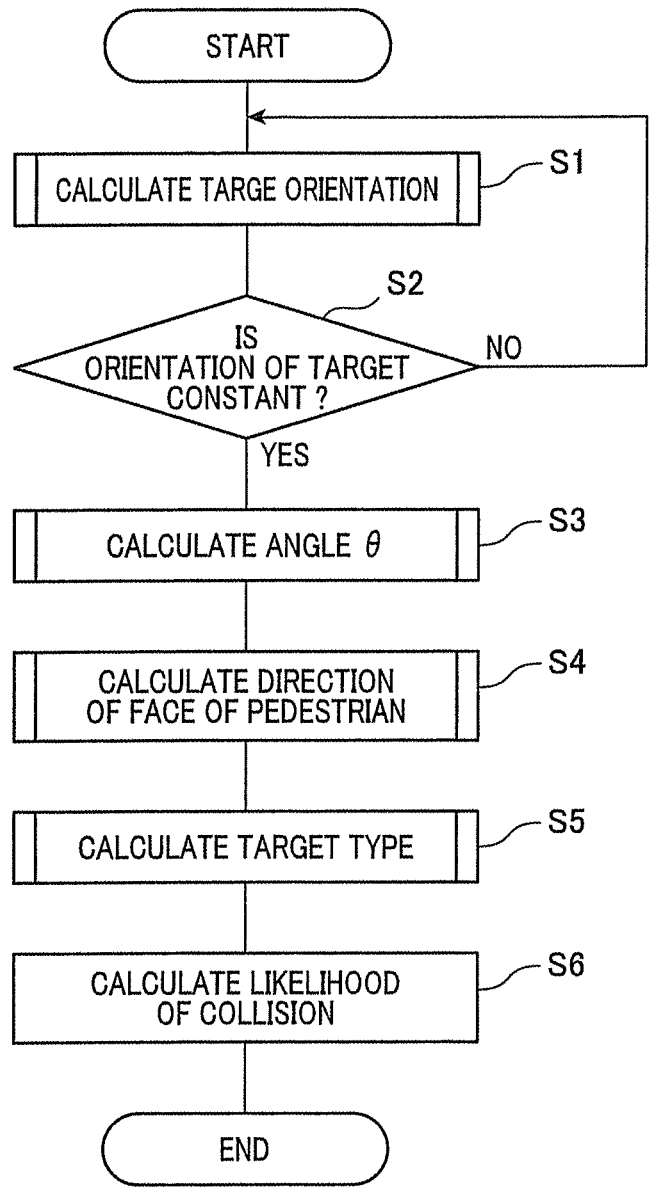
FIG. 4 shows a flowchart of an overall process performed by the on-board system.

A process performed repeatedly at a predetermined interval by the on-board system 1 will be described with reference to FIG. 4 to FIG. 11. FIG. 4 is a flowchart of an overall process performed by the on-board system 1. As shown in FIG. 4, at Step 1, the ECU 3 of the on-board system 1 performs a calculation related to an orientation (relative orientation) of a target. Details of the calculation will be described using the flowchart in FIG. 5.

Figure 5:
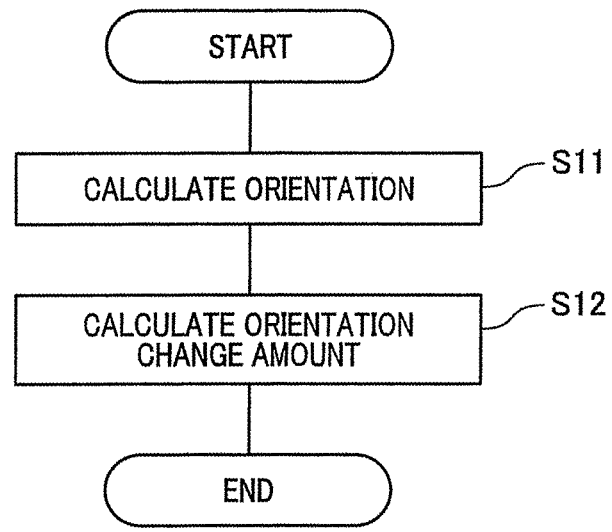
FIG. 5 shows a flowchart of a calculation related to the orientation of a target performed by the on-board system.
Figure 6:
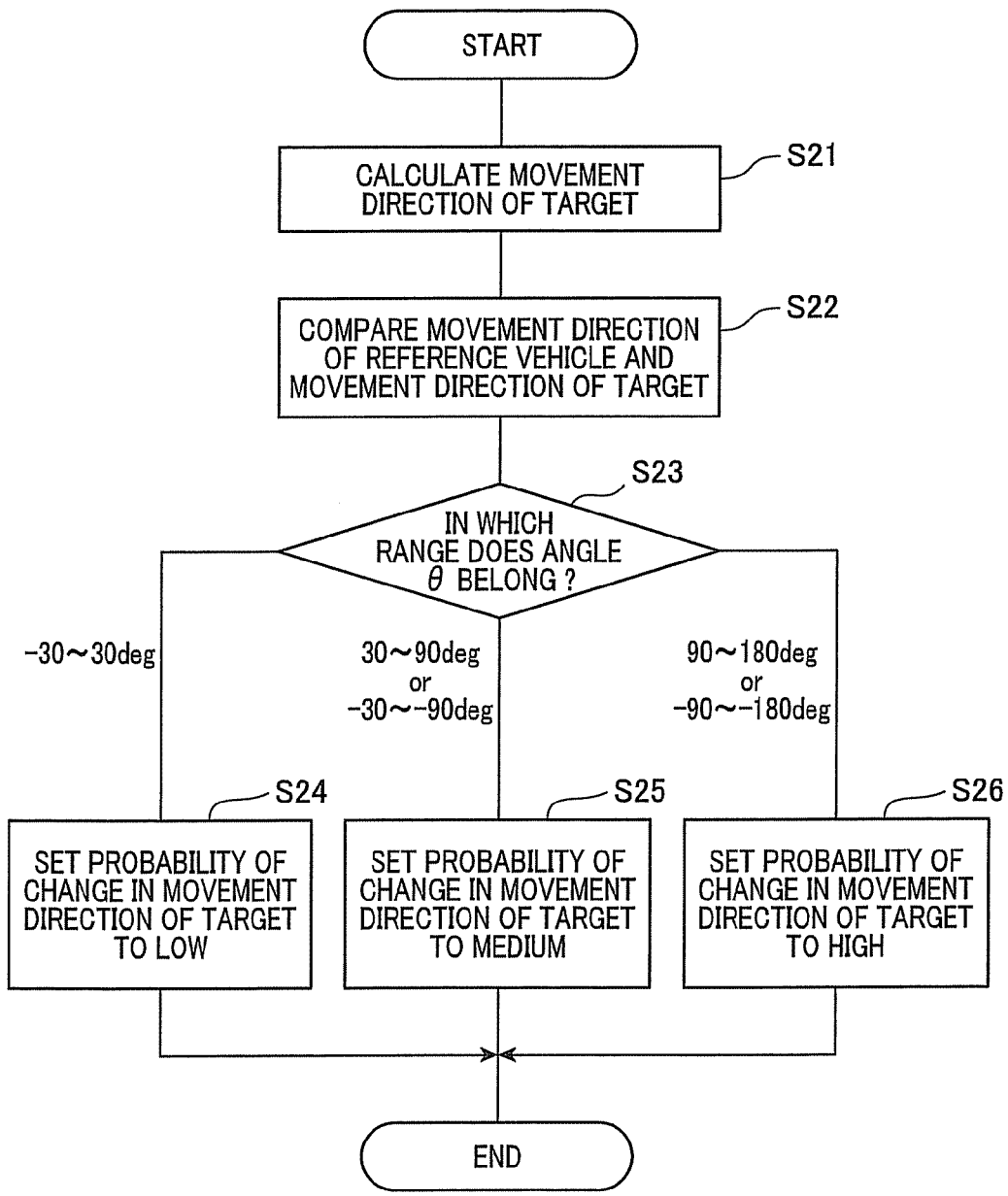
FIG. 6 shows a flowchart of a calculation related to an angle θ performed by the on-board system.
Figure 7:
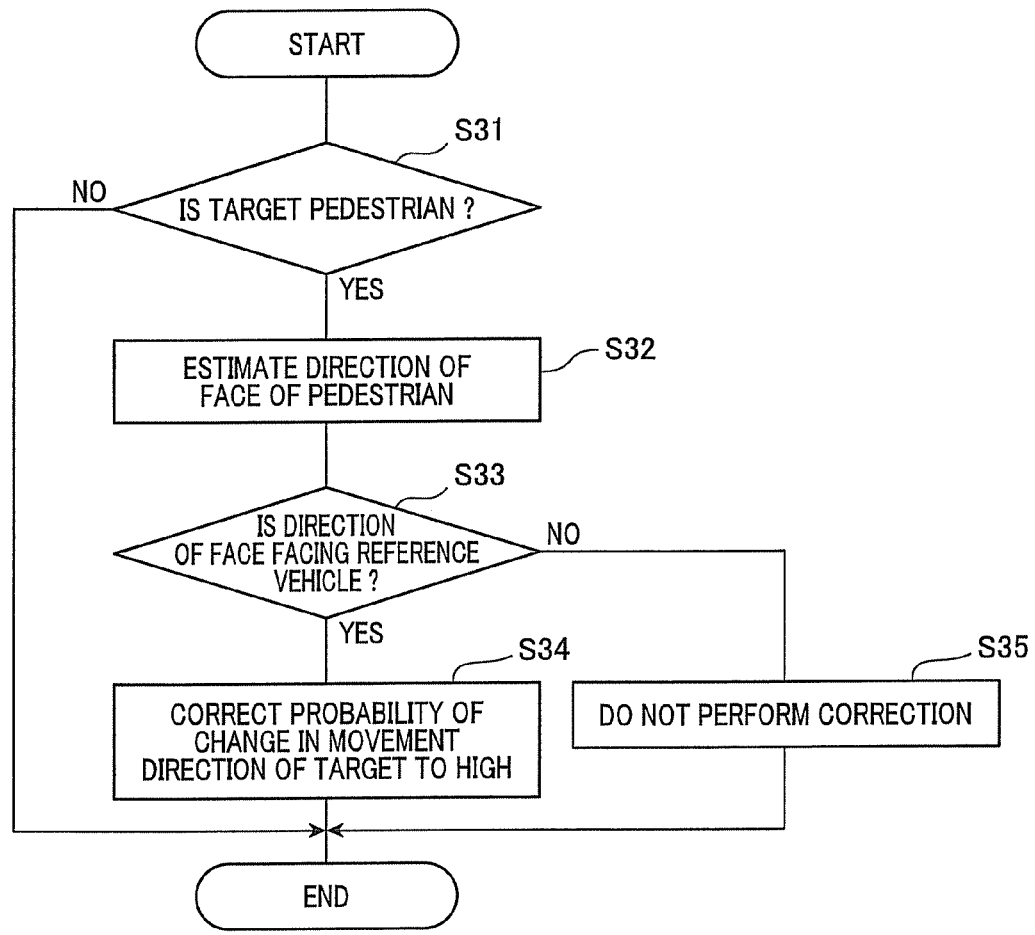
FIG. 7 shows a flowchart of a calculation related to the direction of the face of a pedestrian performed by the on-board system.
Figure 8:
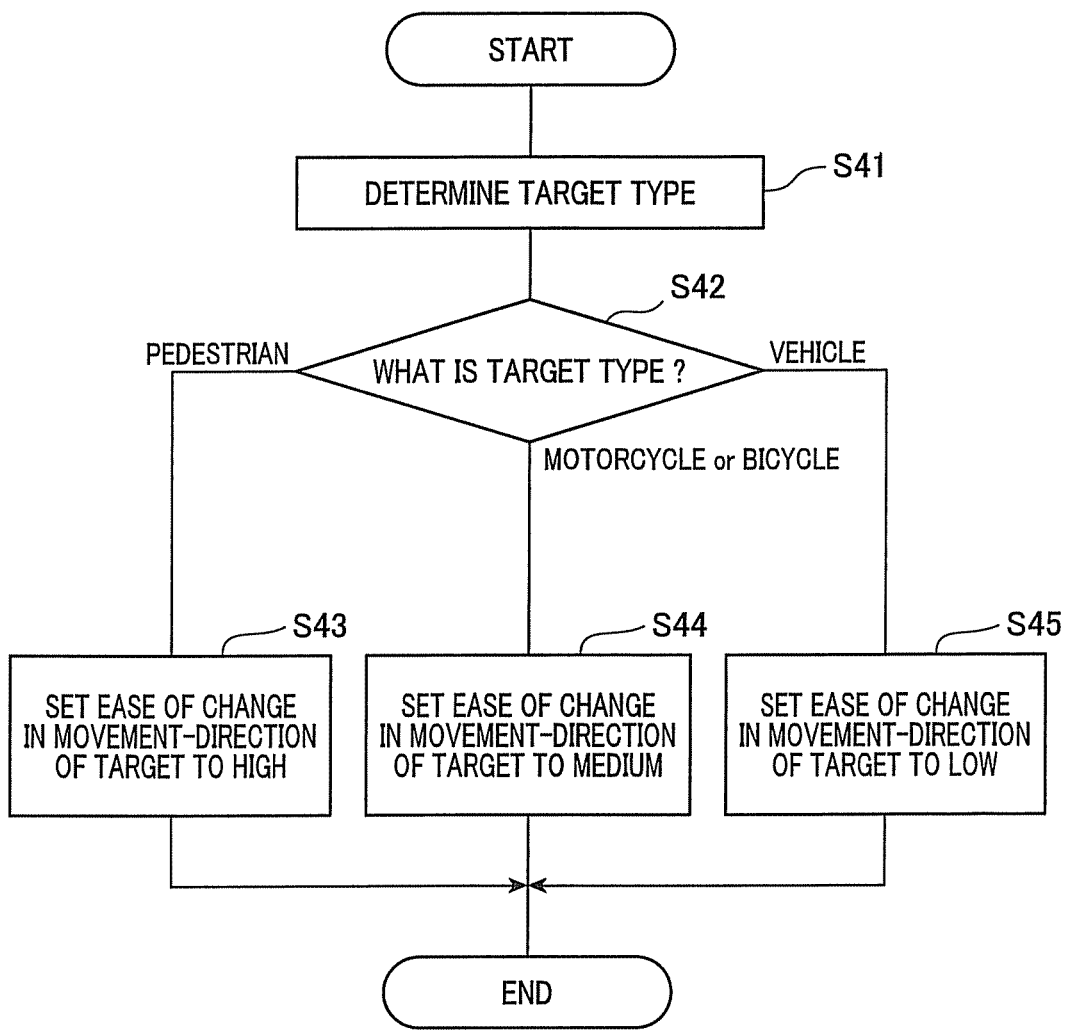
FIG. 8 shows a flowchart of a calculation related to target type performed by the on-board system.

At Step 11 in FIG. 5, the ECU 3 detects a target present around the reference vehicle 101 using the millimeter-wave sensor 9. The ECU 3 then determines the orientation of the target by calculation, based on a center front end of the reference vehicle 101. The image sensor 11, the laser sensor 13, and the infrared sensor 15 may be used to detect the orientation of the target, as the target detection sensor, instead of, or in addition to, the millimeter-wave sensor 9.

At Step 12, the ECU 3 calculates an orientation change amount of the target (the amount of temporal change in the orientation of the target) detected by the processing operation at Step 11 over the past N times that the processing operation at Step 11 has been performed. N is set to be two or more, accordingly.

Returning to the flowchart of the overall process in FIG. 4, at Step 2, the ECU 3 judges whether or not the orientation of the target is constant. When judged that the orientation change amount of the target determined at Step 12 is a predetermined threshold or less, the ECU 3 judges that the orientation of the target is constant. The ECU 3 then proceeds to Step 3. On the other hand, when judged that the orientation change amount of the target exceeds the threshold, the ECU 3 judges that the orientation of the target is not constant. The ECU 3 then returns to Step 1.

At Step 3, the ECU 3 performs a calculation related to an angle θ. The calculation will be described based on the flowchart in FIG. 6. At Step 21, the ECU 3 calculates a movement direction of the target for which the calculation related to orientation has been performed at Step 1. The movement direction refers to a movement direction in a static system (road surface). To calculate the movement direction of the target, first, the ECU 3 repeatedly acquires, at a predetermined interval, a relative orientation of the target relative to the reference vehicle 101. The ECU 3 also repeatedly acquires, at a predetermined interval, the distance from the reference vehicle 101 to the target. From the acquired relative orientations and distances, the ECU 3 calculates a relative movement direction $D_1$ of the target relative to the reference vehicle 101. Next, the ECU 3 calculates a movement direction $D_2$ of the reference vehicle 101 in a static system, using a known method. Finally, the ECU 3 calculates a movement direction $D_3$ of the target in a static system using the movement direction $D_1$ and the movement direction $D_2$.

Figure 11:
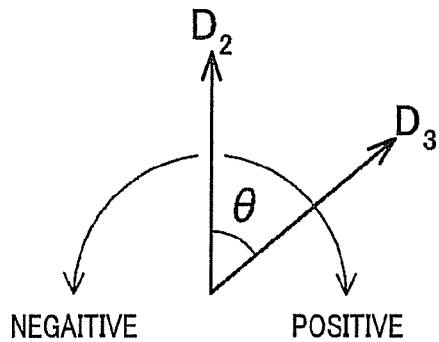
FIG. 11 shows a definition diagram of the angle θ.

At Step 22, the ECU 3 compares the movement direction $D_3$ of the target and the movement direction $D_2$ of the reference vehicle 101, calculated at Step 21. The ECU 3 then calculates the angle θ formed by the movement directions $D_3$ and $D_2$. Here, when the reference vehicle 101 is viewed from above in the vertical direction, as shown in FIG. 11, the angle θ is 0° when the movement direction $D_3$ of the target and the movement direction $D_2$ of the reference vehicle 101 match. The angle θ becomes a positive value when the movement direction $D_3$ of the target turns in a clockwise direction in relation to the movement direction $D_2$ of the reference vehicle 101. In addition, the angle θ becomes a negative value when the movement direction $D_3$ turns in a counter-clockwise direction in relation to the movement direction $D_2$ of the reference vehicle 101.

At Step 23, the ECU 3 judges a range, among a plurality of ranges, to which the absolute value of the angle θ belongs. In other words, when the angle θ is from −30° to 30°, the ECU 3 proceeds to Step 24. When the angle θ is from 30° to 90°, or −90° to −30°, the ECU 3 proceeds to Step 25. When the angle θ is from 90° to 180°, or −180° to −90°, the ECU 1 proceeds to Step 26.

At Step 24, the ECU 3 sets a probability of target movement-direction change (a probability that the movement direction of the target will change) to low. At Step 25, the ECU 3 sets the probability of target movement-direction change to medium. At Step 26, the ECU 3 sets the probability of target movement-direction change to high. Returning to the flowchart in FIG. 4, at Step 4, the ECU 3 performs a calculation related to the direction of the face of a pedestrian. The calculation will be described based on the flowchart in FIG. 7. At Step 31 in FIG. 7, the ECU 3 judges whether or not the type of the target for which the calculation related to orientation has been performed at Step 1 is a pedestrian. The ECU 3 can make the judgment using the image sensor 11. In other words, the ECU 3 captures an image of the target using the image sensor 11. The ECU 3 then performs pattern matching on the captured image. When a pattern corresponding to a pedestrian is recognized, the ECU 3 judges that the target type is a pedestrian. When a pattern corresponding to a pedestrian is not recognized, the ECU 3 judges that the target type is not a pedestrian. When judged that the target type is a pedestrian, the ECU 3 proceeds to Step 32. When judged that the target type is not a pedestrian, the ECU 3 ends the processing operations in FIG. 7. The ECU 3 then proceeds to Step 5 in FIG. 4.

At Step 32, the ECU 3 captures an image of the face of the pedestrian using the image sensor 11. The ECU 3 then performs pattern matching on the captured image and estimates the direction of the face of the pedestrian. At Step 33, the ECU 3 judges whether or not the direction of the face estimated at Step 32 is facing the reference vehicle 101 (the line of sight of the pedestrian is directed towards the reference vehicle 101). When judged that the direction of the face of the pedestrian is facing the reference vehicle 101, the ECU 3 proceeds to Step 34. When judged that the direction of the face is not facing the reference vehicle 101, the ECU 3 proceeds to Step 35.

The probability of target movement-direction change set at Step 24 to Step 26 is high, medium, or low. Regardless of this setting, at Step 34, the ECU 3 corrects the probability of target movement-direction change to high. At Step 35, the ECU 3 maintains the probability of target movement-direction change set at Step 24 to Step 26 (does not perform correction).

Returning to the flowchart in FIG. 4, at Step 5, the ECU 3 performs a calculation related to the target type. The calculation will be described based on the flowchart in FIG. 8. At Step 41 in FIG. 8, the ECU 3 determines the target type. In other words, when judged that the target type is a pedestrian at Step 31, the ECU 3 determines the target type to be a pedestrian. When the target type is judged not to be a pedestrian, the ECU 3 further determines whether the target type is (i) a motorcycle or a bicycle, or (ii) another vehicle.

To make the determination, a method can be used in which the ECU 3 captures an image of the target using the image sensor 11 and performs pattern matching on the captured image. Alternatively, a method can be used that is based on reflection intensity of the millimeter-wave sensor 9. When determined that the target type is a pedestrian, the ECU 3 proceeds to Step 43. When determined that the target type is a motorcycle or a bicycle, the ECU 3 proceeds to Step 44. When determined that the target type is another vehicle, the ECU 3 proceeds to Step 45.

At Step 43, the ECU 3 sets ease of target movement-direction change (the level of ease with which the movement direction of the target can change) to high. At Step 44, the ECU 3 sets the ease of target movement-direction change to medium. At Step 45, the ECU 3 sets the ease of target movement-direction change to low.

Returning to the flowchart in FIG. 4, at Step 6, the ECU 3 performs a calculation of the likelihood of a collision. The ROM 33 provided in the ECU 3 includes a map therein. When the probability of target movement-direction change and the ease of target movement-direction change are inputted into the map, the map outputs a corresponding likelihood of a collision (high, medium, or low) (see FIG. 9). In the map, when the ease of target movement-direction change is the same, the likelihood of a collision becomes higher as the probability of target movement-direction change becomes lower. In addition, when the probability of target movement-direction change is the same, the likelihood of a collision becomes higher as the ease of target movement-direction change becomes lower.

At Step 6, the ECU 3 inputs the probability of target movement-direction change, set at Step 24 to Step 26, and the ease of target movement-direction change, set at Step 43 to Step 45, into the map shown in FIG. 9. The ECU 3 then acquires the corresponding likelihood of a collision.

The on-board system 1 performs a collision avoidance process based on the likelihood of a collision (a judgment result from the collision judging device) acquired at Step 6. The collision avoidance process includes, for example, a process for releasing the accelerator 105, a process for applying the brake 107. a process for increasing the braking force of the brake 107, a process for operating the steering wheel 109 and changing the movement direction of the reference vehicle 101, a process for increasing the restraining force of the seatbelt 111, a process for illuminating or flashing the LED lamp 113, and a process for sounding the buzzer 115. In addition to the foregoing processes, processes effective for avoiding collision with the target can be used as appropriate.

The extent of the collision avoidance process widens as the likelihood of a collision becomes higher. For example, the number of processes to be performed, among the above-described processes, increases as the likelihood of a collision becomes higher. In addition, the intensity of the above-described processes (such as the braking force of the brake 107, the steering angle of the steering wheel 109, the restraining force of the seatbelt 111, the luminance of the LED lamp 113, and the volume of the buzzer 115) increases as the likelihood of a collision becomes higher.

3. Effects Achieved by the On-Board System 1

(1) The on-board system 1 determines the likelihood of a collision when the amount of temporal change in the orientation of a target is a predetermined threshold or less. Here, an instance in which the amount of temporal change in the orientation of the target is a predetermined threshold or less falls under an instance in which there is a likelihood of a collision between the reference vehicle 101 and the target. This will be described with reference to FIG. 10.

Figure 10:
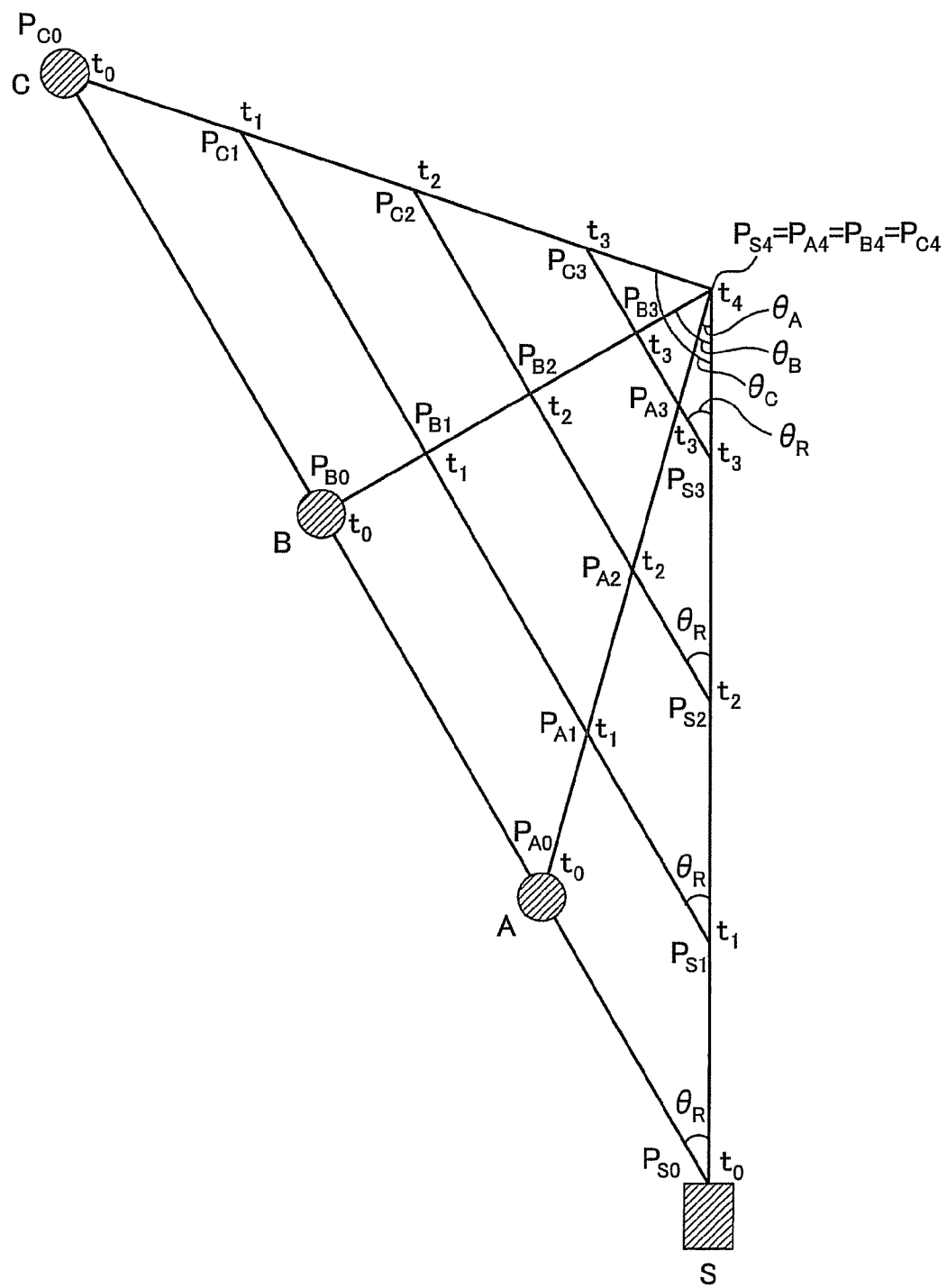
FIG. 10 shows an example of a positional relationship between the reference vehicle and targets in an instance in which there is a likelihood of a collision.

In FIG. 10, a reference vehicle S is moving straight ahead. The reference vehicle S is present at positions $P_{S0}$, $P_{S1}$, $P_{S2}$, $P_{S3}$ and $P_{S4}$ at respective times $t_0$, $t_1$, $t_2$, $t_3$, and $t_4$. In addition, a target A is moving straight ahead in a direction that forms an angle $\theta_A$ ($0°<\theta_A<30°$) with the traveling direction of the reference vehicle S. The target A is present at positions $P_{A0}$, $P_{A1}$, $P_{A2}$, $P_{A3}$, and $P_{A4}$ at respective times $t_0$, $t_1$, $t_2$ $t_3$, and $t_4$.

In addition, a target B is moving straight ahead in a direction that forms an angle $\theta_B$ ($30°<\theta_B<90°$) with the traveling direction of the reference vehicle S. The target B is present at positions $P_{B0}$, $P_{B1}$, $P_{B2}$, $P_{B3}$, and $P_{B4}$ at respective times $t_0$, $t_1$, $t_2$, $t_3$, and $t_4$.

In addition, a target C is moving straight ahead in a direction that forms an angle $\theta_C$ ($90°<\theta_C<180°$) with the traveling direction of the reference vehicle S. The target C is present at positions $P_{C0}$, $P_{C1}$, $P_{C2}$, $P_{C3}$, and $P_{C4}$ at respective times $t_0$, $t_1$, $t_2$, $t_3$, and $t_4$.

Here, the positions $P_{S4}$, $P_{A4}$, $P_{B4}$, and $P_{C4}$ are the same. The reference vehicle S, and the targets A, B, and C collide at time t4. In this instance, as is clear from FIG. 9, the orientation of each target A, B, and C relative to the reference vehicle S is $\theta_R$ at each of the times $t_0$, $t_1$, $t_2$, $t_3$, and $t_4$. In other words, the orientation of each target A, B, and C is constant. In other words, as shown in FIG. 10, an instance in which the orientations of the targets A, B, and C relative to the reference vehicle S do not change over time falls under an instance in which the reference vehicle S and the targets A, B, and C collide, if the situation remains unchanged.

Therefore, the on-board system 1 determines the likelihood of a collision based on the condition that the amount of temporal change in the orientation of the target is a predetermined threshold or less. The on-board system 1 can determine the degree of likelihood of a collision when there is a likelihood of a collision between the reference vehicle 101 and the target.

(2) The on-board system 1 sets the probability of target movement-direction change to be lower as the absolute value of the angle θ formed by the movement direction of the reference vehicle 101 and the movement direction of the target become smaller. As a result, the on-board system 1 determines the likelihood of a collision to be high. The reference vehicle 101 more easily enters a blind spot (the target has more difficulty noticing the presence of the reference vehicle 101) as the absolute value of the angle θ becomes smaller. The likelihood of a collision becomes high. The on-board system 1 determines the likelihood of a collision to be higher as the absolute value of the angle θ becomes smaller, as described above. Therefore, the likelihood of a collision can be appropriately determined based on the state of the target (angle θ).

(3) The ease of changing the movement direction differs depending on the type of target (such as a time difference from the start of a process to change the movement direction until the movement direction actually changes, or the rate of change in the movement direction). For example, the pedestrian most easily changes the movement direction. The vehicle has the most difficulty changing the movement direction. The motorcycle or bicycle falls between the pedestrian and the vehicle. A collision with the reference vehicle 101 becomes more easily avoidable if the target is of a type that can easily change the movement direction. The actual likelihood of a collision becomes low.

The on-board system 1 determines the target type. The on-board system 1 determines the likelihood of a collision using the target type in addition to the angle θ. Specifically, the on-board system 1 determines the likelihood of a collision to be lower if the target type is more easily capable of changing the movement direction. Therefore, the likelihood of a collision can be appropriately determined based on the target type.

(4) When the target type is a pedestrian and the line of sight of the pedestrian is directed towards the reference vehicle 101, the likelihood is high that the pedestrian will notice the presence of the reference vehicle 101 and take action to avoid a collision. Therefore, the actual likelihood of a collision is low. When the target type is a pedestrian and the line of sight of the pedestrian is directed towards the reference vehicle 101, the on-board system 1 corrects the probability of target movement-direction change to high. As a result, the likelihood of a collision is more easily determined to be low. Therefore, the likelihood of a collision can be appropriately determined based on the type and state of the target.

(5) The on-board system 1 changes the content of the collision avoidance process depending on the likelihood of a collision (the judgment result from the collision judging device) determined based on the state of the target. Therefore, the collision avoidance process can be appropriately performed.

4. Variation Examples (1) The on-board system 1 does not necessarily have to perform the process related to the direction of the face of a pedestrian at Step 4. In this instance, the ECU 3 can use the probability of target movement-direction change set at Step 24 to Step 26 in the calculation of the likelihood of a collision at Step 6, without correcting the probability of target movement-direction change.

(2) The on-board system 1 may not perform the calculation related to the target type at Step 5. In this instance, in the calculation of the likelihood of a collision at Step 6, the ECU 3 can determine the likelihood of a collision based only on the probability of target movement-direction change. For example, when the probability of target movement-direction change is low, the ECU 3 determines that the likelihood of a collision is high. When the probability of target movement-direction change is medium, the ECU 3 determines that the likelihood of a collision is medium. When the probability of target movement-direction change is high, the ECU 3 determines that the likelihood of a collision is low.

(3) At Step 23, the angle θ is divided into three ranges. However, the number of ranges may be another plural number m (such as m=2, 4, 5, 6, ...). In addition, the probability of target movement-direction change can be set based on each range. In this instance, the number of levels in the likelihood of a collision can be set accordingly based on the number of ranges of the angle θ.

Figure 12:
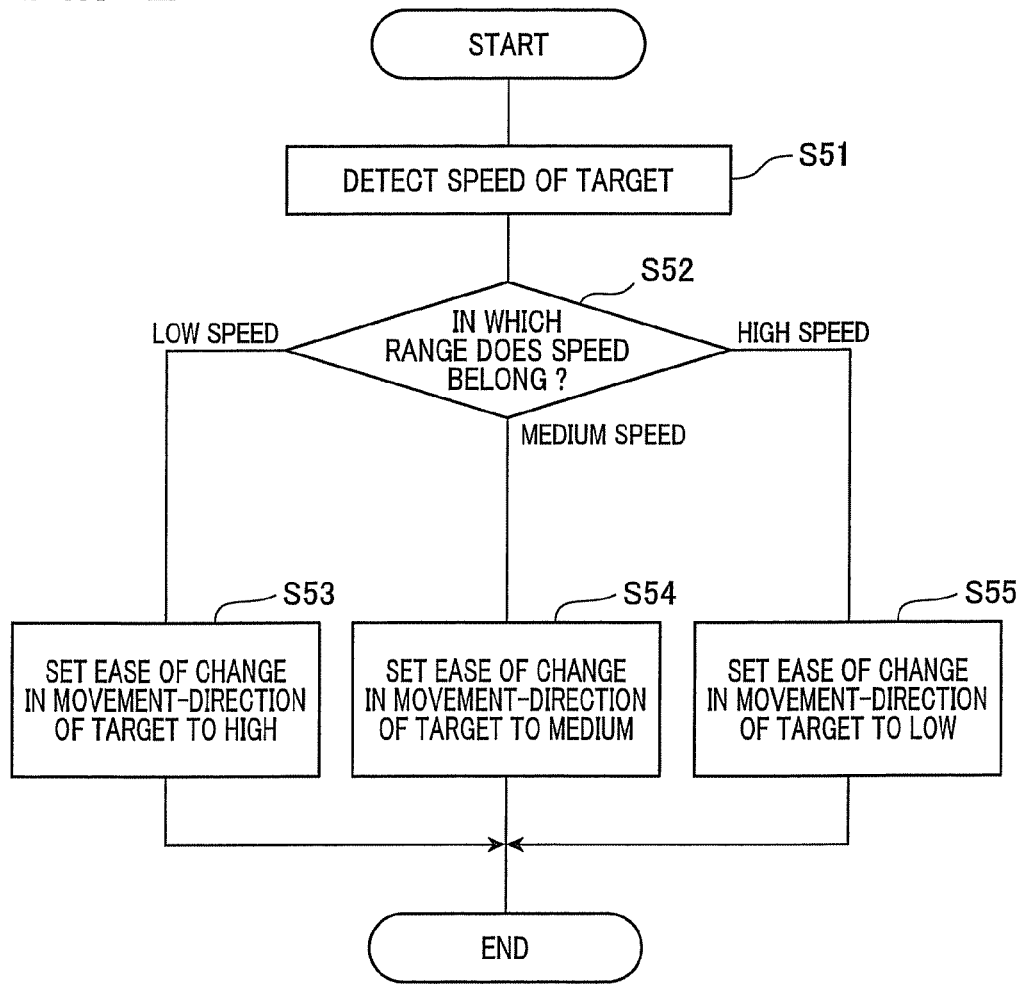
FIG. 12 shows a flowchart of a calculation related to the speed of a target performed by the on-board system.

(4) At Step 5, the ECU 3 may perform a process related to the speed of the target, shown in FIG. 12, instead of the process related to the target type. In the process related to the speed of the target, at Step 51, the ECU 3 detects the speed of the target. At Step 52, the ECU 3 determines whether the detected speed is a low speed (such as less than 30 km/h), a medium speed (such as 30 km/h to 60 km/h), or a high speed (such as higher than 60 km/h).

When judged that the speed is a low speed, the ECU 3 proceeds to Step 53 and sets the ease of target movement-direction change to high. When judged that the speed is a medium speed, the ECU 3 proceeds to Step 54 and sets the ease of target movement-direction change to medium. When judged that the speed is a high speed, the ECU 3 proceeds to Step 55 and sets the ease of target movement-direction change to low. In other words, the ease of target movement-direction change is set to be lower as the speed of the target increases.

The present invention is not limited in any way by the above-described embodiment. Various modifications can be made without departing from the present invention. For example, the on-board system 1 may detect various factors (such as the brightness outside of the vehicle, the weather [the occurrence and heaviness of rain, snow, fog, etc.], and the like). The on-board system 1 may then correct the likelihood of a collision based on the detection result.

What is claimed is:

1. A device for judging a likelihood of a collision between a vehicle and a target, wherein the device used by being mounted in the vehicle in order to judge a likelihood of a collision between the vehicle and the target, comprising:
    a target detection sensor being suitable for detecting the target presenting around the vehicle; and
    an ECU (electronic control unit), wherein the ECU comprises:
    a CPU;
    an orientation determining unit configured to enable the CPU to determine the orientation of a target relative to a reference vehicle in which the device for judging a likelihood of a collision is mounted, using information which is detected by the target detection sensor;
    a change-amount detecting unit configured to enable the CPU to detect an amount of temporal change in the orientation of the target; and
    a determining unit configured to enable the CPU to determine a likelihood of a collision between the reference vehicle and the target under a condition that the amount of temporal change in the orientation of the target is a predetermined threshold or less.

2. The device according to claim 1, wherein the ECU further comprises an angle calculating unit configured to enable the CPU to calculating an angle formed by a movement direction of the reference vehicle and a movement direction of the target using information which is detected by the target detection sensor, wherein the determining unit determines the likelihood of the collision between the reference vehicle and the target to be higher as the absolute value of the angle becomes smaller.

3. The device according to claim 2, wherein the device further comprises an image sensor; and the ECU further comprises a target judging unit configured to enable the CPU to judge a type of the target using an image which is captured by the image sensor, wherein the determining unit determines the likelihood of the collision between the reference vehicle and the target using both the angle and a judged type of the target.

4. The device according to claim 3, wherein the ECU further comprises a specific condition fulfillment judging unit configured to enable the CPU to judge whether or not a specific condition has been fulfilled that the target is a pedestrian and a line of sight of the pedestrian is directed towards the reference vehicle, using the image which is captured by the image sensor, wherein, in a case where the specific condition has been fulfilled, the determining unit determines the likelihood of the collision between the reference vehicle and the target to be lower than a case that the specific condition has been not fulfilled.

5. The device according to claim 1, wherein the device further comprises an image sensor; and the ECU further comprises a target judging unit configured to enable the CPU to judge a type of the target using an image which is captured by the image sensor, wherein the determining unit determines the likelihood of the collision between the reference vehicle and the target using both the angle and a judged type of the target.

6. The device according to claim 1, wherein the ECU further comprises a specific condition fulfillment judging unit configured to enable the CPU to judge whether or not a specific condition has been fulfilled that the target is a pedestrian and a line of sight of the pedestrian is directed towards the reference vehicle, using the image which is captured by the image sensor, wherein, in a case where the specific condition has been fulfilled, the determining unit determines the likelihood of the collision between the reference vehicle and the target to be lower than a case that the specific condition has been not fulfilled.

7. A vehicle collision avoidance system, comprising:
    a first device that is mounted to a vehicle and configured to judge a likelihood of a collision between a vehicle and a target; and
    a second device that is mounted in the vehicle and performs a collision avoidance process based on a judgment result which is acquired by the first device,
    the first device comprising:
    a target detection sensor that is configured to detect the target presenting around the vehicle; and
    a processor that is configured to:
        determine, by an orientation determining unit, an orientation of a target relative to the vehicle, using information which is detected by the target detection sensor;
        detect, by a change-amount detecting unit, an amount of temporal change in the orientation of the target; and
        determine, by a determining unit, a likelihood of a collision between the vehicle and the target under a condition that the amount of temporal change in the orientation of the target is a predetermined threshold or less.

8. A method for judging a likelihood of a collision between a vehicle and a target, the method comprising:
    determining, by an orientation determining unit configured in a processor provided in a vehicle collision avoidance system mounted to the vehicle, an orientation of the target relative to the vehicle using information which is detected by a target detection sensor with which the vehicle mounts;
    detecting, by a change-amount detecting unit configured in the processor, an amount of temporal change in the orientation of the target; and
    determining, by a determining unit configured in the processor, a likelihood of a collision between the vehicle and the target under a condition that the amount of temporal change in the orientation of the target is a predetermined threshold or less.

9. The method according to claim 8, wherein the method further comprises:
    calculating, by an angle calculating unit configured in the processor, an angle formed by a movement direction of the vehicle and a movement direction of the target using information which is detected by the target detection sensor,
    wherein the step of determining the likelihood of the collision determines, by the determining unit, that the likelihood is higher as the absolute value of the angle becomes smaller.

10. The method according to claim 9, wherein the method further comprises:

judging, by a target judging unit configured in the processor, a type of the target based on an image which is captured by an image sensor with which the vehicle mounts such that the likelihood of the collision between the vehicle and the target is judged also using a judged type of the target.

11. The method according to claim 10, wherein the method further comprises:
   judging, by a specific condition fulfillment judging unit configured in the processor, whether or not a specific condition has been fulfilled that the target is a pedestrian and a line of sight of the pedestrian is directed towards the vehicle, based on an image which is captured by the image sensor,
   wherein, in a case where the specific condition has been fulfilled, the step of determining the likelihood of the collision determines, by the determining unit, the likelihood of the collision to be lower than a case that the specific condition has been not fulfilled.

12. The method according to claim 8, wherein the method further comprises:
   judging, by a target judging unit configured in the processor, a type of the target based on an image which is captured by an image sensor with which the vehicle mounts, thereby the likelihood of the collision between the vehicle and the target is judged also using a judged type of the target.

13. The method according to claim 8, wherein the method further comprises:
   judging, by a specific condition fulfillment judging unit configured in the processor, whether or not a specific condition has been fulfilled that the target is a pedestrian and a line of sight of the pedestrian is directed towards the vehicle, based on an image which is captured by an image sensor with which the vehicle mounts,
   wherein, in a case where the specific condition has been fulfilled, the step of determining the likelihood of the collision determines, by the determining unit, the likelihood of the collision to be lower than a case that the specific condition has been not fulfilled.

14. A method for avoiding a collision between a vehicle and a target, the method comprising:
   a step of judging, by a first device mounted to a vehicle, a likelihood of a collision between the vehicle and a target; and
   a step of performing, by a second device mounted to the vehicle, a collision avoidance process based on a result which is acquired by the step of judging a likelihood of a collision,
   the step of judging a likelihood of a collision comprising:
      determining, by an orientation determining unit configured in a processor provided in the first device, an orientation of the target relative to the vehicle using information which is detected by a target detection sensor with which the vehicle mounts;
      detecting, by a change-amount detecting unit configured in the processor, an amount of temporal change in the orientation of the target; and
      determining, by a determining unit configured in the processor, a likelihood of a collision between the vehicle and the target under a condition that the amount of temporal change in the orientation of the target is a predetermined threshold or less.

* * * * *